(12) United States Patent
Torres Martinez (10) Patent No.: US 11,309,577 B2
(45) Date of Patent: Apr. 19, 2022

(54) PRESSURIZED ELECTROCHEMICAL BATTERY AND PROCESS FOR MANUFACTURING THE SAME

(71) Applicant: Manuel Torres Martinez, Pamplona (ES)

(72) Inventor: Manuel Torres Martinez, Pamplona (ES)

( * ) Notice: Subject to any disclaimer, the term of this patent is extended or adjusted under 35 U.S.C. 154(b) by 0 days.

(21) Appl. No.: 17/176,817

(22) Filed: Feb. 16, 2021

(65) Prior Publication Data

US 2021/0167414 A1 Jun. 3, 2021

Related U.S. Application Data (62) Division of application No. 16/148,504, filed on Oct. 1, 2018, now Pat. No. 11,211,634.

(30) Foreign Application Priority Data

Aug. 28, 2018 (ES) .............................. ES201830846

(51) Int. Cl.
| | | |
|---|---|---|
| *H01M 10/04* | (2006.01) | |
| *H01M 10/613* | (2014.01) | |
| *H01M 10/6556* | (2014.01) | |

(52) U.S. Cl.
CPC ... *H01M 10/0468* (2013.01); *H01M 10/0422* (2013.01); *H01M 10/0431* (2013.01); *H01M 10/613* (2015.04); *H01M 10/6556* (2015.04)

(58) Field of Classification Search
CPC .......... H01M 10/0468; H01M 10/613; H01M 10/6556; H01M 10/0422; H01M 10/0431
See application file for complete search history.

(56) References Cited

U.S. PATENT DOCUMENTS

| | | | | |
|---|---|---|---|---|
| 4,383,013 A | * | 5/1983 | Bindin | H01M 10/615 429/112 |
| 4,578,324 A | * | 3/1986 | Koehler | H01M 10/6567 429/439 |
| 2002/0192553 A1 | | 12/2002 | Barker et al. | |
| 2005/0170240 A1 | * | 8/2005 | German | H01M 50/60 429/120 |
| 2011/0003187 A1 | * | 1/2011 | Graaf | H01M 10/625 429/120 |
| 2017/0250406 A1 | | 8/2017 | Armand et al. | |
| 2018/0219252 A1 | | 8/2018 | Itaya | |

FOREIGN PATENT DOCUMENTS

| | | |
|---|---|---|
| KR | 101439080 B1 | 9/2014 |
| WO | 2018008682 A1 | 1/2018 |

\* cited by examiner

*Primary Examiner* — Golam Mowla
(74) *Attorney, Agent, or Firm* — Lucas & Mercanti, LLP (57) ABSTRACT

A pressurized electrochemical battery and process for manufacturing the same, which comprises several connectors to at least one electrochemical cell with several electrical energy collectors that are connected to the connectors, with the electrochemical cell comprising several electrode sheets and several solid electrolyte sheets inserted between the electrode sheets, and at least one deformable chamber arranged in contact with the electrochemical cell, with the deformable chamber supplied with a fluid that deforms the chamber to apply pressure to the electrochemical cell.

7 Claims, 6 Drawing Sheets

PRESSURIZED ELECTROCHEMICAL BATTERY AND PROCESS FOR MANUFACTURING THE SAME

CROSS REFERENCE TO RELATED APPLICATION

This is a division of U.S. application Ser. No. 16/148,504 filed Oct. 1, 2018, which claimed the priority of Spanish application No. P201830846 filed Aug. 28, 2018, the contents of each of which are incorporated herein by reference.

TECHNICAL BACKGROUND

The present invention is related to storage systems of electrical energy, specifically to energy storage systems by electrochemical means, proposing a pressurized battery with solid electrolyte and a process for manufacturing the same that optimizes the contacts between the components and improves the storage and discharge capacity of the battery, along with the number of cycles that it can withstand.

STATE OF THE ART

The sector of electrochemical batteries is a sector that has evolved significantly through different technologies and applications. Currently, the leading battery technology is lithium ion, due mainly to its large capacity for accumulation of energy per unit of mass and its resistance to multiple charge and discharge cycles.

These batteries are made up of a set of components. Of these, the principal components are the electrodes, the anode and cathode, and the electrolyte. The anode is usually made up of an active material such as graphite and the cathode is made up of another active material, such as a lithium oxide, both generally in a sheet format. These materials allow lithium atoms to be ceded or accumulated. The electrolyte is usually a material with a certain load of a lithium salt, with the capacity to allow the lithium ions to move through this medium. The operating principal of these batteries is that the anode and cathode are two active materials capable of generating a different reduction potential, which, by means of a red-ox reaction when both electrodes are connected and are in contact through an electrolyte that allows the movement of lithium ions, leads to the generation of electrical current.

The scarcity of lithium, as well as the other common materials in lithium oxides, in the earth's crust has prompted research into alternative materials due to supply problems and monopolies. In comparison with lithium, the simplest alternative would be sodium, an alkali metal with a very similar structure, but unlike lithium, one of the most abundant ones on the planet. The use of sodium involves several conditioning factors in comparison with lithium (lower power densities, larger atomic size, different active materials and electrolytes, etc.) but the principles of action are the same, so it is seen as probably the most interesting line of research to reduce material costs in batteries, especially for stationary applications where the final weight of the battery is not as critical as in mobile applications.

In addition to the principal components described above, a series of materials are normally used in the anode and cathode that act as an electrical conductor (aluminum, copper, etc.), facilitating the contact between the active materials and the conduction of the generated current to the exterior of the battery. A separation material between the anode and cathode is normally used, especially with the use of liquid electrolytes, given that direct contact between them could lead to the appearance of chemical reactions that damage the battery. This separation material is usually a microperforated polymer that allows ions to pass through.

The management of battery temperature is a critical aspect of the technology, because it is sometimes necessary to maintain a specific operating temperature to optimize operation. In addition, uncontrolled thermal situations that could lead to what are known as "thermal runaways", or exothermal reactions that damage or even destroy the battery, must also be prevented.

Within the field of electrolytes, the liquid electrolytes already mentioned are normally used, generally based on organic solvents with a certain load of lithium salt. However, this type of electrolyte poses a series of drawbacks in the manufacturing processes as well as during battery operation, in terms of contact and wear, which translate into poor performance and shorter lifetime. For this reason, the battery sector is beginning to look into the use of solid electrolytes that eliminate those issues.

There is currently one main problem in relation to the development of electric batteries using solid electrolytes, which is the capacity to generate good contact between the active materials and the electrolyte. If the contact is not good, it is more difficult for the ions to move from one electrode to the other, and therefore the charge/discharge capacity and even the power density of the battery is lower.

In addition, especially in the case of sodium-ion batteries, the movement of ions from one electrode to the other involves significant variations in the volume of the electrodes, which can cause problems of deformation and cracking of some components, which result in damage or the total loss of the battery.

In addition, currently in the battery sector, manufacturing processes are focused on the manufacture of small cells with, with limited production rates and semi-automatic manufacturing processes. This means that in the final scenario, the cost of lithium in a battery is around 2%, versus the 65% that the cells may represent in the total cost, with the estimated manufacturing costs of cells at a significant 35% of the total cost of the battery.

Below, as an example, a series of documents are listed that show the current battery manufacturing processes, in other words, mainly using lithium, liquid electrolytes, and manufacturing processes with a low level of automation.

The document WO2018008682 describes a battery manufacturing process, but it uses liquid electrolyte in its composition with the complexity that this involves in the manufacture, and the detriment to performance that it causes during operation.

The document US2018219252 describes the manufacturing process for a solid electrolyte battery, but that uses lithium in its active materials, despite the scarcity of this element, and does not use a system to control the pressure exerted between the electrolyte and the electrode.

The document US20020192553 presents a sodium-ion battery with reversible operation, but whose electrolyte is in the liquid state, which complicates the automation of the manufacturing process of the batteries and shortens their lifetime.

The document KR101439080 describes a sodium battery with solid electrolyte that maximizes the contact area between electrodes and electrolyte to achieve the maximum possible performance, but that does not use additional means to facilitate said contact and to be able to regulate it during battery operation.

The document US2017250406 presents a sodium-ion battery with a sodium metal anode and a solid ceramic electrolyte conductor of sodium ions, but whose efficiency depends to a large extent on the quality of contact between the electrodes and the electrolyte and it does not use any additional system to facilitate or maximize contact, and requires the addition of a second electrolyte for correct operation.

SUMMARY OF THE INVENTION

The invention relates to an electrochemical battery with an improved structural execution that makes it possible to increase the contact between the active materials of the battery and the electrolyte, improving the performance and electrical charge capacity of the battery. The invention also relates to a process to manufacture an electrochemical battery that makes it possible to automate the manufacturing process and achieve high production rates.

The pressurized electrochemical battery that is the object of the invention comprises:
  several anode and cathode connectors,
  at least one electrochemical cell with several electrical energy collectors that are connected to the connectors, with the electrochemical cell comprising:
    several electrode sheets, and
    several solid electrolyte sheets inserted between the electrode sheets, and
  at least one deformable chamber arranged in contact with the electrochemical cell, with the deformable chamber supplied with a fluid that deforms the chamber to apply pressure to the electrochemical cell.

This means that the deformable chamber supplied with the fluid makes it possible to regulate and control the surface contact between the different sheets of the electrochemical cell, optimizing battery performance, improving the storage and discharge capacity of the battery, and increasing the number of charge cycles that the battery can withstand during its lifetime.

According to an exemplary embodiment of the invention, the battery comprises various electrochemical cells, with each cell pressed between two deformable chambers. Preferably, the electrochemical cells have a cylindrical configuration and are arranged according to a concentric distribution, which makes it possible to optimize the space occupied by the battery and simplify its manufacture.

The deformable chambers are connected to a system of fluid supply collectors, such that by means of said fluid, the pressure exerted by the chambers can be regulated, and the battery can be cooled, which, among other factors, improves the storage capacity of the battery.

Preferably, the collector system has a delivery system to control the intake flow to the collector system and a pressure regulator to adjust the pressure inside the deformable chambers.

Each electrode sheet comprises two layers of active material and one layer of conductive material, wherein the layers of active material partially cover both sides of the layer of conductive material, with the ends of the layer of conductive material protruding with respect to the layers of active material, using said protruding part of the layer of conductive material for the collectors to obtain electrical energy from the electrochemical cells that are connected to the battery connectors.

According to an exemplary embodiment, the electrode sheets are formed by anode sheets and cathode sheets of a same active material. According to another exemplary embodiment, the electrode sheets are formed by anode sheets and cathode sheets of different active materials. In other words, several of the electrode sheets are connected to the anode connector and other electrode sheets are connected to the cathode connector, with said sheets able to be made of the same material or different materials.

Preferably, the solid electrolyte is made of a polymer, ceramic or composite material.

Another object of the invention is a process for manufacturing a pressurized electrochemical battery that comprises the steps of:
  the use of a first roll that has an electrode sheet, a first sheet, overlaid on a sheet of solid electrolyte,
  the use of a second roll that has another electrode sheet, a second sheet, overlaid on another sheet of solid electrolyte,
  the use of a rotating spindle on which a deformable chamber is positioned,
  alternately winding on the deformable chamber the first electrode sheet with the solid electrolyte sheet and the second electrode sheet with the other solid electrolyte sheet,
  encapsulating the assembly formed by the electrode sheets, solid electrolyte and the deformable chamber.

This obtains a process for manufacturing electrochemical batteries that may be automated, achieving high production rates and therefore minimizing the unit manufacturing cost of the battery.

DETAILED DESCRIPTION OF THE INVENTION

Figure 1:
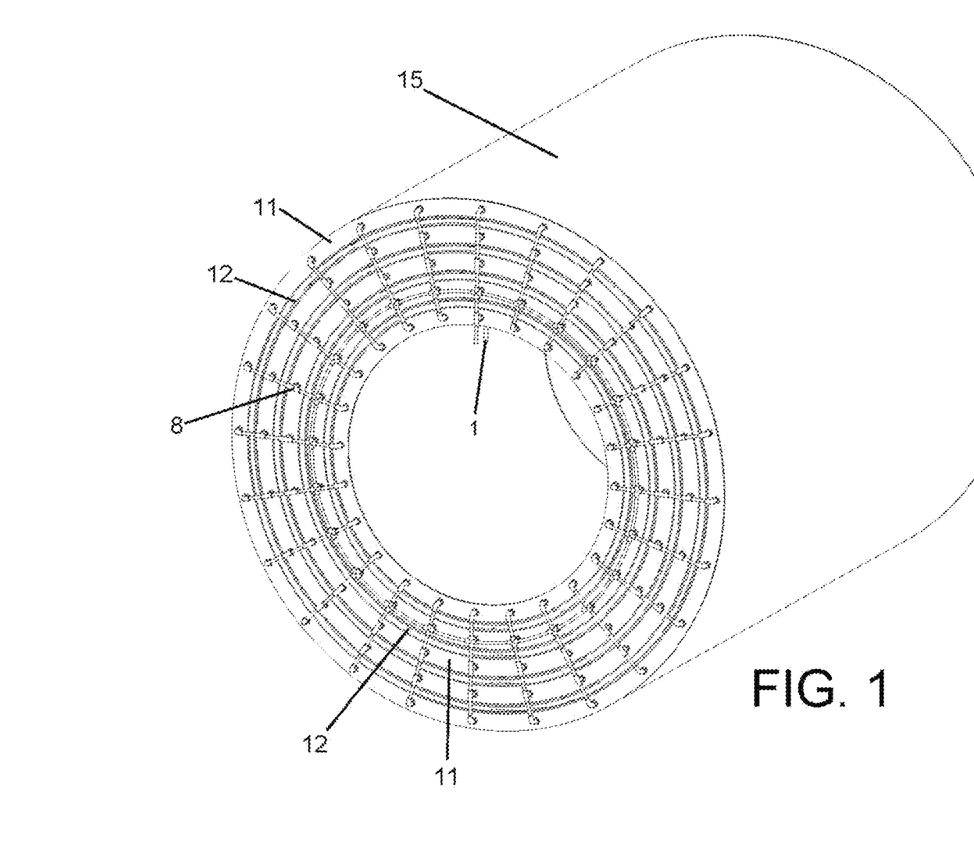
FIG. 1 shows a perspective view of a pressurized electrochemical battery according to a preferred embodiment of the invention.

FIG. 1 shows a pressurized electrochemical battery according to a preferred embodiment of the invention, wherein the battery has a cylindrical configuration, although it is not limited to this configuration and the battery may adopt other shapes with this not altering the concept of the invention.

Figure 2:
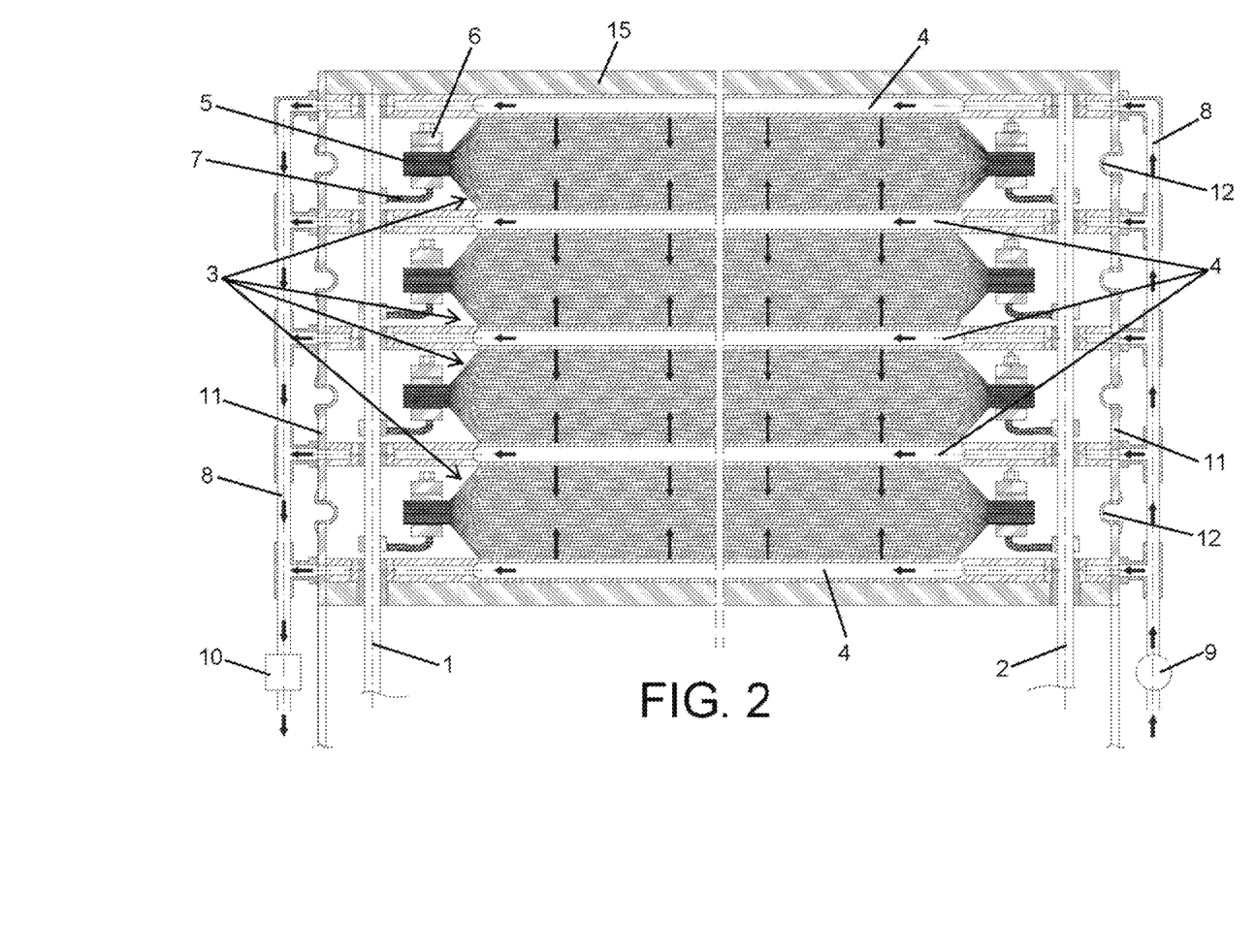
FIG. 2 shows a longitudinal cross-section view of a part of the pressurized electrochemical battery in the previous figure.

The cross-section view of FIG. 2 shows the interior configuration of the preferred embodiment of the battery in FIG. 1. The battery comprises several connectors (1,2) or terminals, wherein said connectors are an anode connector (1) and a cathode connector (2), through which electrical energy that is stored in the battery is charged and discharged.

In the preferred exemplary embodiment in FIG. 2, the battery comprises a set of electrochemical cells (3), wherein each one of the cells (3) is arranged between two deformable chambers (4) that receive a fluid, such that said fluid makes it possible to modify the size of the chambers (4), deforming them, and therefore pressing the elements that make up the electrochemical cell (3) to ensure adequate contact between them.

The vertical black arrows shown on the electrochemical cells (3) in FIG. 2 indicate the direction in which the deformable chambers (4) exert pressure on the cells (3). The other black arrows in FIG. 2 indicate the direction of the fluid that is received by the chambers (4).

In the preferred embodiment in FIGS. 1 and 2, the electrochemical cells (3) have a cylindrical configuration and are arranged according to a concentric distribution, making it possible to optimize the occupied space.

Optionally, each one of the electrochemical cells (3), individually or the set all of them collectively, may be covered by a sealing material or be arranged in a sealing encapsulation.

Also optionally, there may be internal structural components separating each one of the electrochemical cells (3) of the battery.

In any case, it its most simplified configuration, the battery would have a single electrochemical cell (3) that on one of its long sides would be arranged in contact with a deformable chamber (4) and on its opposite long side would be arranged in contact with a fixed part of the battery. Preferably, said single cell (3) would be arranged between two deformable chambers (4).

The electrochemical cells (3) have several collectors (5) at each one of their ends. The collectors (5) are secured by several flanges (6) and are connected to the connectors (1,2) by means of several electrical conductors (7). The collectors (5) of one of the ends of the cell (3) are connected electrically to the anode connector (1) and the collectors (5) of the other end of the cell (3) are connected electrically to the connector of the cathode (2).

Each one of the deformable chambers (4) has a fluid intake and outlet that are connected to a system of collectors (8) through which the fluid that is supplied to the chambers (4) circulates.

Preferably, the fluid that is supplied to the chambers (4) is a cooling fluid, such that the deformable chambers have a dual function; on one hand, regulating the pressure applied to the electrochemical cells (3), and on the other, cooling the battery.

Thus, the chambers (4) have both adjustable temperature and pressure, both of which may be adjusted depending on the specific operating conditions of the battery. The pressure and temperature may be different depending on the battery process state: charging, discharging or at rest.

Since the pressure can be modified based on the operating conditions, in addition to improving the contact between the elements that make up the electrochemical cells (3), the battery conform to the volume variations in the cell (3) in response to the ion exchanges that they undergo during the charging and discharging processes.

Preferably, the system of collectors (8) has a delivery system (9) and a pressure regulator (10). The delivery system (9) is located at the intake of the system of collectors (8) and makes it possible to control the intake flow to the system of collectors (8), and with this, the battery temperature, while the pressure regulator (10) makes it possible to adjust the pressure inside the deformable chambers (4), and with this, the contact between the elements that make up the cells (3).

The electrochemical cells (3) are arranged under conditions of a vacuum and controlled atmosphere inside the battery. Thus, the electrochemical cells (3) are installed in a housing defined between two deformable chambers (4) that are closed at their ends by several lateral covers (11). Said lateral covers (11) have several expansion seals (12) that make it possible to absorb the contractions experienced by the housings of the electrochemical cells (3) when the fluid of the chambers (4) deforms them.

The electrochemical cells (3) are made up of several electrode sheets (13) and several solid electrolyte sheets (14), with the electrode sheets (13) being inserted between the solid electrolyte sheets (14).

Figure 3:
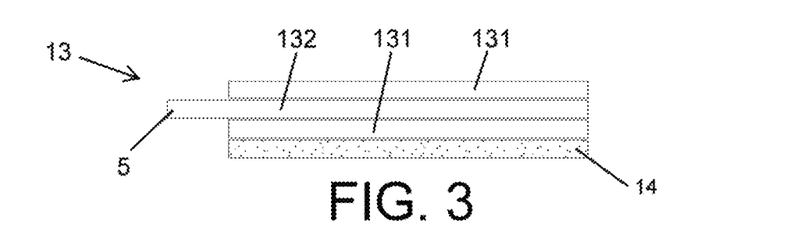
FIG. 3 shows a schematic view of the layers that form an electrode sheet that is arranged on a solid electrolyte sheet.
Figure 4:
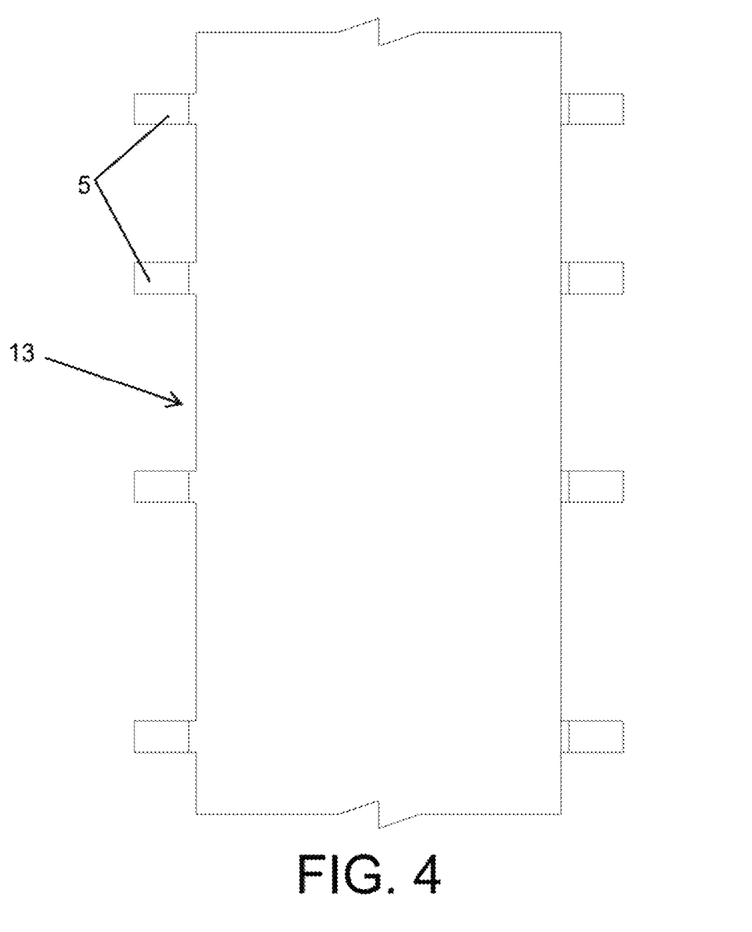
FIG. 4 shows a partial view of the electrode sheet of the previous figure.

As shown in FIG. 3, each electrode sheet (13) comprises two layers of active material (131) and one layer of conductive material (132). The layers of active material (131) are arranged on both sides of the layer of conductive material (132), partially covering them, such that the layer of conductive material (132) protrudes with respect to the layers of active material (131) at its ends, with said ends acting as electrical energy collectors (5) that will be connected to the connectors or terminals (1,2) to extract and generate the voltages and currents expected in the design of the battery.

Also as shown in FIG. 3, the electrode sheet (13) is arranged on the solid electrolyte sheet (14), with the ends of the sheet of conductive material (132), in other words, the collectors (5) protruding with respect to the solid electrolyte sheet (14).

The material of the electrode sheets (13) will depend on the final chemistry of the battery; in the case of lithium, the active material of the anode could be graphite and the active material of the cathode a lithium oxide (LCO, LNO, NMO, NMC, . . . ), while, in the case of sodium, the electrode sheets (13) could use active materials such as hard carbons in the anode and sodium oxide, Prussian blue, or even organic-based materials as the active material in the cathode. In both cases, lithium or sodium metal could also be considered for the active material of the anode. The solid electrolyte (14) could be made of a polymer material, a ceramic material, or even a composite.

In addition, the deformable chambers (4) are made of deformable materials, which include elastomers or even metals, such as aluminum in films with a limited thickness.

Figure 5:
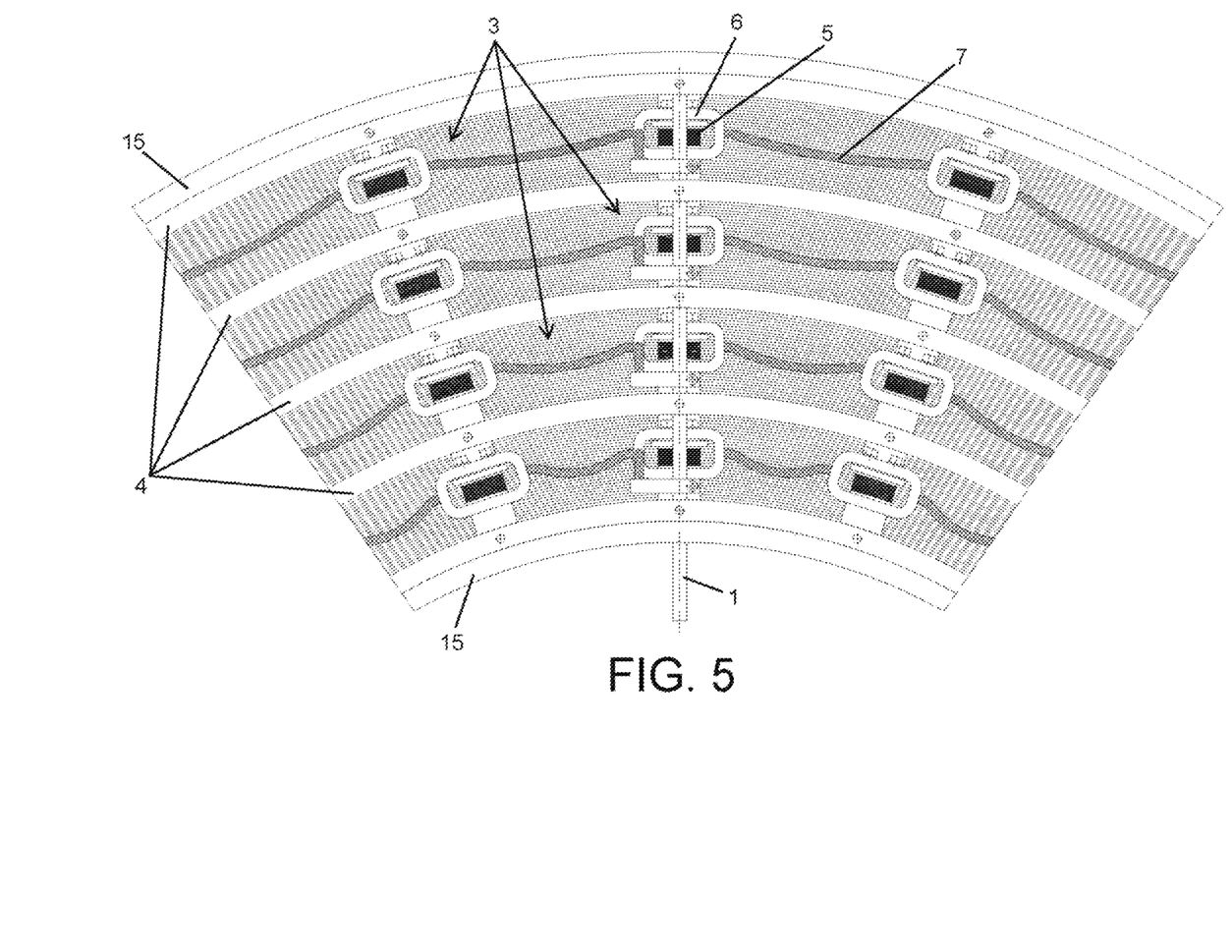
FIG. 5 shows a cross-section view of a part of the pressurized electrochemical battery in FIGS. 1 and 2 with continuous electrode sheets.
Figure 6:
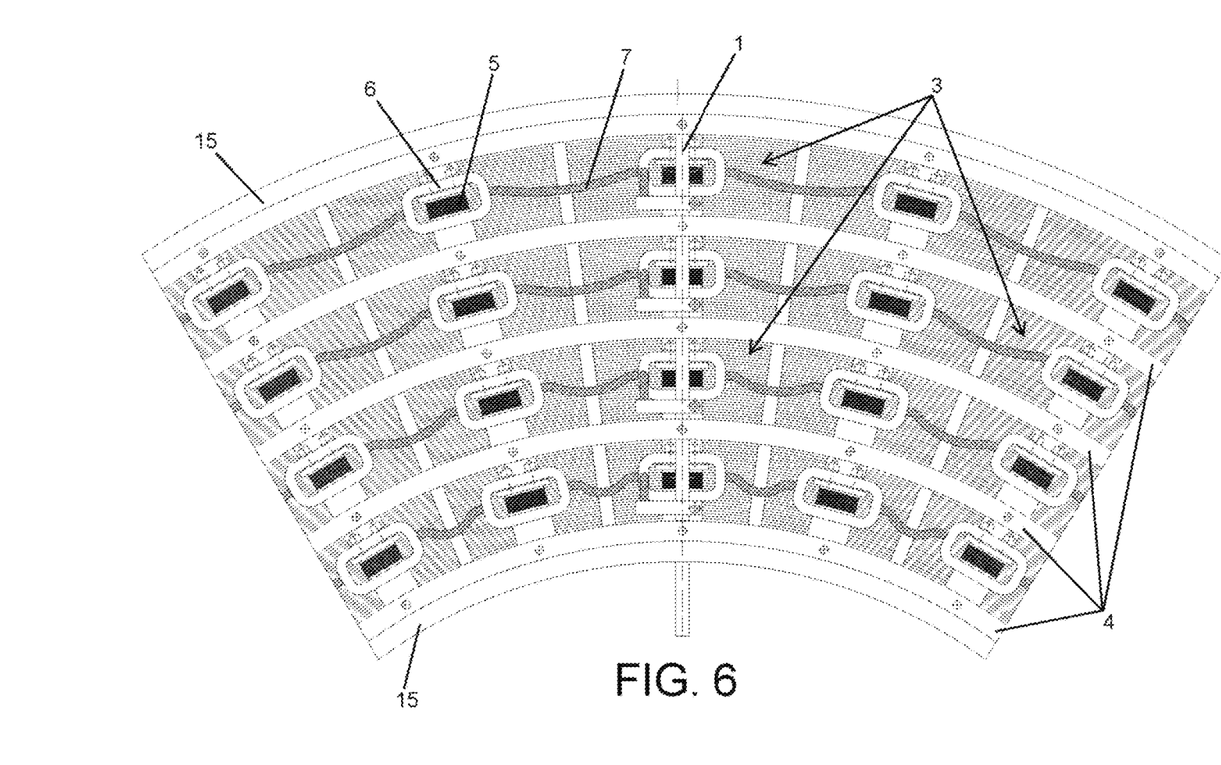
FIG. 6 shows a cross-section view of a part of the pressurized electrochemical battery in FIGS. 1 and 2 with discontinuous electrode sheets.

The electrode sheets (13) may be continuous, as shown in FIG. 5, or discontinuous, as shown in FIG. 6, such that there is a separation between sheets (13). This will provide a certain degree of flexibility in the deformation of the sheets (13), such that they can slide between them in response to the application of interior pressure without experiencing mechanical stresses that could damage them.

Likewise, when the electrode sheets (13) that are connected to the anode connector (1) and the electrode sheets (13) that are connected to the cathode connector (2) are made of the same active material, said separation between sheets (13) is favorable to prevent short-circuits.

In regard to the solid electrolyte sheets (14), depending on the type of material of the electrolyte, they may have an arrangement of sheets with a limited length, as shown in FIG. 6, or if their mechanical properties allow it, they may be continuous and deform in response to the pressure exerted, as shown in FIG. 5.

Preferably, the sheets (13,14) have several cavities in the radial direction of the battery through which they are equipped with several conduits for an additional fluid with cooling properties. Said cavities can be connected to an additional system to supply a liquid or gaseous fluid, such that it allows the delivery of said fluid through said conduits, in addition to the fluid that is circulating through the deformable chambers (4). Using a tempered fluid with controlled temperature throughout all of the cavities and chambers (4) achieves thermal management that improves the performance of the battery, avoiding the problems associated with overheating and even allowing the generation of batteries that are thicker than the set of sheets (13,14), thus increasing their storage capacity.

According to the embodiment shown in FIG. 2, the collectors (5) are interconnected, preferably by means of a soldering process, and grouped by the flanges (6), so that by means of the collectors (5), the set of electrode sheets (13) that make up the electrochemical cells (3) are grouped together. This means that there will be one contact zone in each cell (3) for each connector (1,2). In another alternative configuration (not shown in the figures), there may be a contact zone at each one of the lateral ends of the layer of conductive material (132) for each one of the connectors (1,2).

Preferably, the electrical conductors (7) that connect the collectors (5) to the connectors (1,2) are made of a flexible material, such that said material tolerates and adapts to the different deformations that the battery experiences during its operation. The battery has been designed to have an exterior encapsulation (15), which acts as a barrier between different batteries that may be arranged in series, such that said encapsulation (15) prevents a battery from coming into direct contact with adjacent batteries.

The following section describes the procedure for the manufacture of the battery with a cylindrical configuration in the preferred embodiment shown in FIGS. 1 and 2, although it is evident for a person skilled in the art that batteries with configurations other than a cylindrical configuration can be obtained using the described procedure, with this not altering the concept of the invention.

Figure 7:
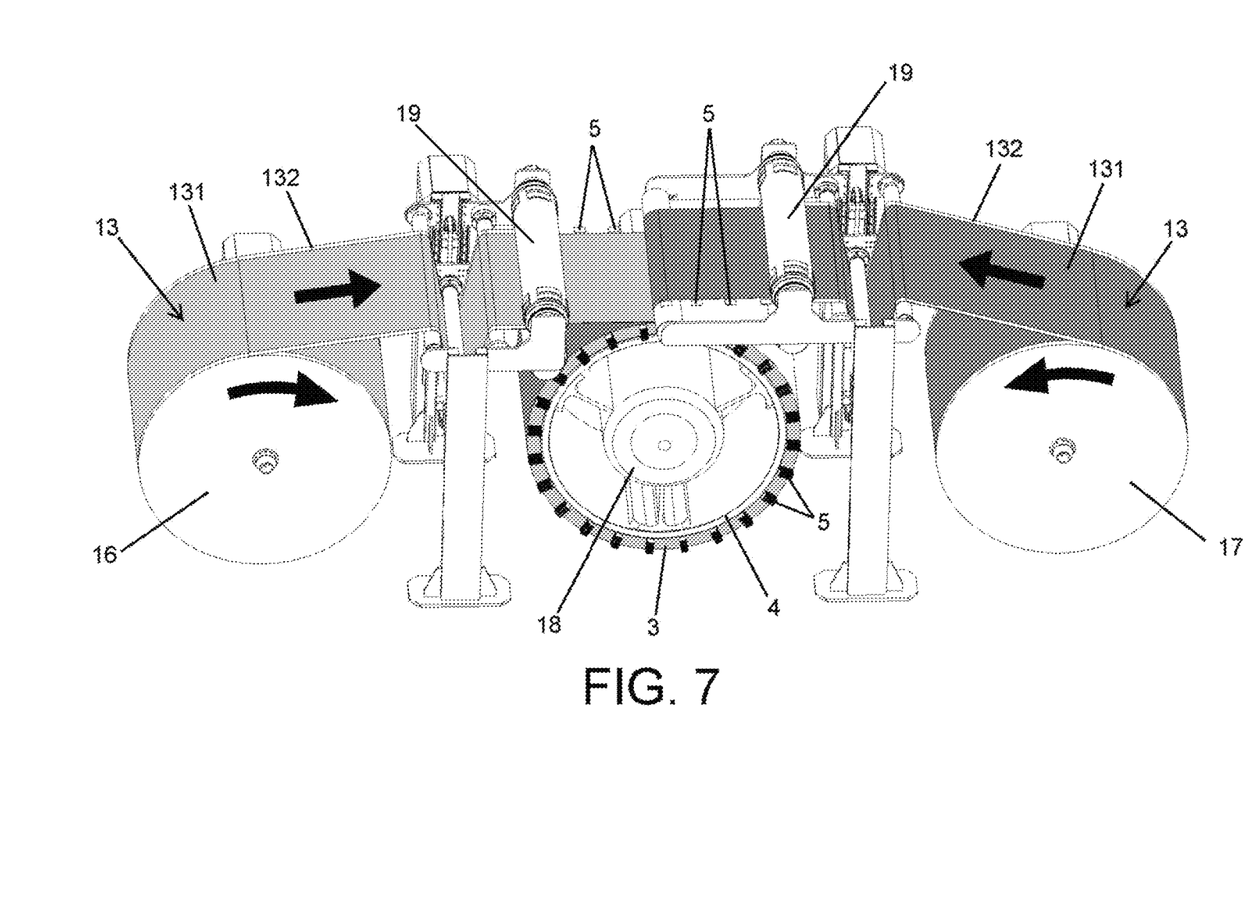
FIG. 7 shows a perspective view of a machine for carrying out the manufacture of a pressurized electrochemical battery like the one represented in the exemplary embodiment in FIGS. 1 and 2.

As shown in FIG. 7, the battery is manufactured by means of a winding process, wherein electrode sheets (13) and solid electrolyte sheets (14) are progressively overlaid on a deformable chamber (4).

To do this, a first roll (16) that has an electrode sheet (13), a first sheet, overlaid on a solid electrolyte sheet (14), and a second roll (17) that has another electrode sheet (13), a second sheet, overlaid on another sheet of solid electrolyte (14) are used. The sheet (13) of the first roll (16) will be connected to the anode connector (1) and the other sheet (13) of the second roll (17) will be connected to the connector of the cathode (2), as will be explained below.

In addition, the deformable chamber (4) is arranged on a rotating spindle (18), and the sheets (13,14) of the first and second rolls (16,17) are wound in an alternating manner on said deformable chamber (4) until an electrochemical cell (3) with a desired thickness is obtained on the chamber (4).

The electrode sheet (13) overlaid on a solid electrolyte sheet (14) has a configuration like the one shown in FIG. 3 and that was described above. Thus, the electrode sheet (13) comprises two layers of active material (131) between which a layer of conductive material (132) is positioned and which protrudes with respect to the layers of active material (131).

By means of several rotating cutting dies (19) the ends of the electrode sheets (13) are partially cut to obtain several electrical energy collectors (5). To do this, the electrode sheets (13) are passed through the dies (19), partially cutting the layer of conductive material (132), which protrudes with respect to the layers of active material (131).

As shown in detail in FIG. 7, the layer of conductive material (132) that protrudes with respect to the layers of active material (131) of the sheet (13) of the first roll (16), is only trimmed on one side, such that collectors (5) are defined for the connection to the anode connector (1). In addition, the layer of conductive material (132) that protrudes with respect to the layers of active material (131) of the sheet (13) of the second roll (17), is only trimmed on one the other side, such that collectors (5) are defined for the connection to the cathode connector (2).

After obtaining the electrochemical cell (3), the collectors (5) are flanged and soldered to each other, and are then interconnected electrically to the collectors (5) by means of several electrical conductors (7) and the collectors (5) of one of the ends of the cell (3) are connected electrically to the anode connector (1) and the collectors (5) of the other end of the cell (3) are connected electrically to the cathode connector (2). Lastly, the assembly formed by the electrode sheets (13), solid electrolyte (14) and the deformable chamber (4) is placed in an encapsulation (15).

To obtain a battery with several electrochemical cells (3), like the one shown in FIG. 2, prior to encapsulation and the electrical connection of the collectors (5), several assemblies of electrode sheets (13), solid electrolyte (14), and deformable chambers (4) are wound, winding said assemblies around each other according to a concentric distribution.

To obtain the rolls (16,17), first, a layer of conductive material (132), such as aluminum, copper or another more advanced material, such as lithium-aluminum alloys, is automatically unrolled and sent to a system for the application of a coating to cover the layer of conductive material (132) with layers of active material (131).

Said layers of active material (131) may be applied by means of printing systems, electrostatic adhesion, or by any other method for coating or priming layers, and it may even consist of a layer of active material (131) such as lithium or sodium metal. The electrode sheet (13) will be obtained in this manner.

A solid electrolytic coating is then applied on the electrode sheet (13), with said coating applied on one or both sides of the electrode sheet (13). The electrode sheet (13) with the solid electrolyte sheet (14) is obtained in this manner. Preferably, the solid electrolyte sheet (14) is applied from a roll of solid electrolytic material.

In one configuration of the invention, the electrode sheets (13) and solid electrolyte sheets (14) are cut before being wound onto the deformable chamber (4). In another configuration of the invention, the electrode sheet (13) is cut, but leaving the solid electrolyte sheet (14) uncut. In another configuration, cuts are not made in the sheets (13,14), so that the sheets wound onto the deformable chamber (4) are continuous, instead of having limited lengths.

The process described for the manufacture of the rolls (16,17) will be executed in installations with a controlled atmosphere, preferably with a relative humidity below 0.01%, and preferably with a pressurized atmosphere that prevents leaks towards the interior, with the consequent possibility that moisture may enter the enclosure. In an alternative configuration, the described process will be executed in installations with a strong vacuum to achieve the proper working conditions.

The application of the solid electrolyte mainly isolates the active materials from the external atmosphere and therefore, this process must be carried out in an atmosphere with no special requirements that are demanding as controlled atmosphere as in the case of the active materials.

The rotating spindle (18) is expandable, or with variable dimensions, so that it can accommodate the different concentric deformable chambers (4) optimally. This means that using one spindle (18), it is possible to manufacture batteries with cells (3) with different internal diameters.

In a preferred configuration of the manufacturing process, the temperature of the spindle (18) and material is managed in a controlled manner, so that, by means of controlled thermal expansion, the final adjustments and contacts between components can be more precise.

The invention claimed is:

1. A manufacturing process of a pressurized electrochemical battery comprising:
    using a first roll that has an electrode sheet overlaid on a solid electrolyte sheet;
    using a second roll that has another electrode sheet overlaid on another solid electrolyte sheet;
    using a rotating spindle on which a deformable chamber is positioned;
    alternately winding on the deformable chamber the electrode sheet with the solid electrolyte sheet and the other electrode sheet with the other solid electrolyte sheet;
    encapsulating the assembly formed by the electrode sheets, solid electrolyte and the deformable chamber.

2. The manufacturing process according to claim 1, wherein prior to encapsulation, several assemblies formed by electrode sheets, solid electrolyte, and deformable chamber are wound, winding said assemblies around each other according to a concentric distribution.

3. The manufacturing process according to claim 1, wherein several rotating cutting dies are used to partially cut ends of the electrode sheets to obtain several electrical energy collectors.

4. The manufacturing process according to claim 1, wherein the electrical energy collectors of one of the electrode sheets are located on one side and the electrical energy collectors of the other electrode sheets are located on the opposite side.

5. The manufacturing process according to claim 1, wherein several rotating cutting dies are used to cut the electrode sheets without cutting solid electrolyte sheets prior to the alternately winding step.

6. The manufacturing process according to claim 1, wherein the process is repeated to generate a product with multiple windings, incorporating the deformable chamber between each of the alternately winding step.

7. The manufacturing process according to claim 6, wherein the electrical energy collectors resulting from different sections of the alternately windings are interconnected electrically by means of electrical conductors.

* * * * *